United States Patent [19]

Akiba

[11] Patent Number: 4,802,574

[45] Date of Patent: Feb. 7, 1989

[54] ABSORBENT FOR A GAS PRESERVATIVE ATOMOSPHERE

[76] Inventor: Yosuke Akiba, 21-11, Sendagaya 1-chome, Shibuya-ku, Tokyo, Japan

[21] Appl. No.: 127,165

[22] Filed: Dec. 1, 1987

[51] Int. Cl.[4] .................. B65D 81/26; B65D 81/22
[52] U.S. Cl. .................................. 206/204; 206/205; 239/56; 426/124
[58] Field of Search ............... 206/204, 205; 239/56; 426/124, 129; 428/116

[56] References Cited

U.S. PATENT DOCUMENTS

| 4,124,116 | 11/1978 | McCabe, Jr. | 206/204 |
| 4,382,507 | 5/1983 | Miller | 206/204 |
| 4,629,064 | 12/1986 | Barner | 206/204 |
| 4,749,600 | 6/1988 | Cullen et al. | 206/204 |
| 4,756,939 | 7/1988 | Goodwin | 206/204 |
| 4,770,920 | 9/1988 | Larsonneur | 206/204 |

Primary Examiner—Joseph Man-Fu Moy
Attorney, Agent, or Firm—Poms, Smith, Lande & Rose

[57] ABSTRACT

Apparatus for storing and dispersing food preservatives in a closed food container. The apparatus includes an absorbent strip sandwiched between two layers of non-woven fabric to form a non-woven fabric combination. This combination is then placed between two layers of plastic film in a lattice network, which is then placed between plastic cover layers. The plastic cover layers are sealed or left opened along their edges allowing the absorbent's gas emission rate to be quantitatively controlled and regulated by means of prearranged perforations and selective opening of the sides and faces of the plastic cover layers.

14 Claims, 2 Drawing Sheets

ABSORBENT FOR A GAS PRESERVATIVE ATOMOSPHERE

BACKGROUND OF INVENTION

The present invention relates to the preservation of food. More particularly, the present invention relates to apparatus for storing and dispersing food preservatives in a closed food container.

The preservation of food has been an important concern to mankind since the beginning of time. A problem associated with this concern is the fact that preservatives could not be stored with the food without the food losing its color, flavor, or nutritional value. In fact, many food stores today sell only natural, non-preserved foods for these very reasons.

In order to utilize a preservative with a food product, the preservative must either be incorporated within the food itself or else put on an absorbent and placed adjacent to the food in a closed environment. The former type of preservation is undesirable since chemical additives incorporated directly into the food may be harmful to the human body.

The latter choice, placing the preservatives onto an absorbent and allowing the preservatives to evaporate, is a preferred preservation method. One of the first gaseous preservatives to be used was gaseous ethanol. However, gaseous ethanol was not entirely satisfactory because even after a brief exposure period, the food tended to become tainted with an ethanol odor. U.S. Pat. No. 4,550,026, discloses improved gaseous preservatives wherein aliphatic acids are added to the ethanol. The ethanol/aliphatic acid preservatives were found to reduce these ethanol odors.

The above described gaseous preservatives are typically used by placing the preservatives on an absorbent material such as silicon dioxide, sucrose, dextrin, fine crystalline cellulose, and kalorin. The preservatives are then allowed to evaporate to provide a preservation atmosphere around the food substance. There is however, one problem with this method. That is, there is not an effective way to control the time of evaporation.

Another problem with the above listed absorbents is the safety to consumers. Absorbents which are packaged as sachets, paper bags, and plastic bags, are not aesthetically appealing and the average consumer psychologically resists purchasing an item which has foreign entities inside or around his food. Plus, since these packages do look much different from the food itself, infants tend to be attracted to this oddity and may attempt to put the absorbents in their mouths.

In addition, the manufacturing of conventional absorbents is not efficient. Production is very expensive and there is high tendency for the packages which hold the absorbents to puncture and break. This in turn leads to lost production time and increased costs.

Consequently, a need exists for improvements in food preservation absorbents which will result in greater preservation efficiency, safety to consumers, and manufacturing efficiency.

SUMMARY OF THE INVENTION

In accordance with the present invention, a food preservation absorbent and apparatus has been discovered which increases the effectiveness of storing and dispersing food preservatives in a closed food container.

The present invention is based on placing an absorbent strip between two layers of non-woven fabric forming a non-woven fabric combination. The non-woven fabric combination is then placed between two layers of plastic film forming a plastic film combination. Finally, the plastic film combination is placed between two plastic cover layers.

While present absorbents lack means to regulate the rate of evaporation of the liquid preservative therefrom, the new absorbent's gas emission rae can be quantitatively controlled and regulated by prearranged perforations and by opening the sides and faces of the strip absorbent. The new absorbent is also psychologically pleasing to the consumer since it can be used as if it were a part of the vessel or package of food. Therefore, small children are not enticed to put it in their mouths. Furthermore, the production process is minimized to the assembly of the pre-cut absorbent body and preservation liquids.

Accordingly, the present invention relates to apparatus and method for controlling the rate of gaseous emission of a liquid preservative. The present invention may be used as a substrate for any of the known gaseous preservatives but it is especially well suited for use with the ethanol and aliphatic acid preservative mixtures disclosed in U.S. Pat. No. 4,550,026.

In accordance with the present invention a liquid mixture of preservative is absorbed onto the absorbent body, and it can be placed in a vapor permeable bag. The liquid mixture absorbent is then placed within a suitable closed food preservation vessel where the liquid mixture is allowed to vaporize to provide an atmosphere of preservative. In this way, food which is placed within the preservation vessel is exposed to the preserving atmosphere in calculated quantities while direct contact with the liquid mixture is avoided.

The above discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 6 is a time-based graph illustrating the evaporation rate of the present invention when the gaseous emission rate is quantitatively controlled as shown in FIGS. 5a–d.

DETAILED DESCRIPTION

Figure 3:
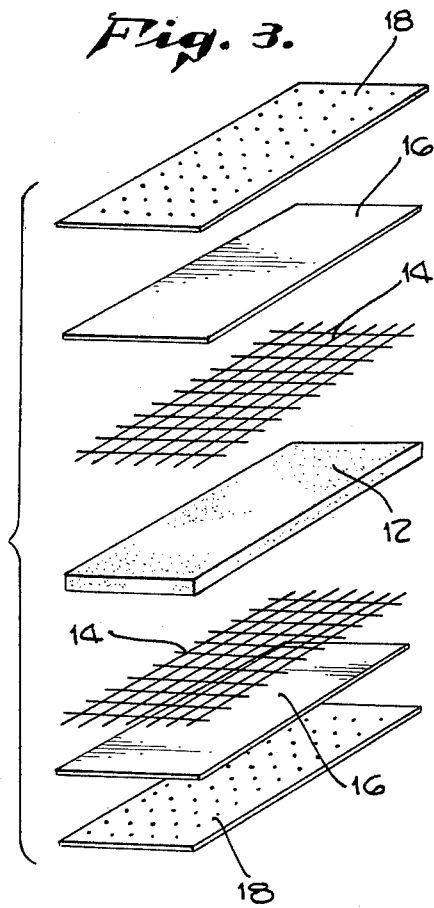
FIG. 3 is an exploded view of the food preservation absorbent and dispersing apparatus of FIG. 1.

Referring now to the drawings, and more particularly to FIG. 3, there is shown a food preservation apparatus, generally designated 10, for dispersing gaseous food preservatives into a food vessel. The food preservation apparatus 10 includes an absorbent strip 12 with a layer of non-woven fabric 14, a layer of plastic film 16, and a plastic cover layer 18 consecutively positioned on each side of the absorbent strip.

Figure 1:
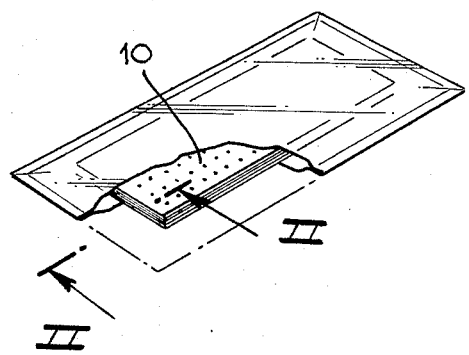
FIG. 1 is a perspective view of a preferred exemplary food preservation absorbent and dispersing apparatus of the present invention.
Figure 2:
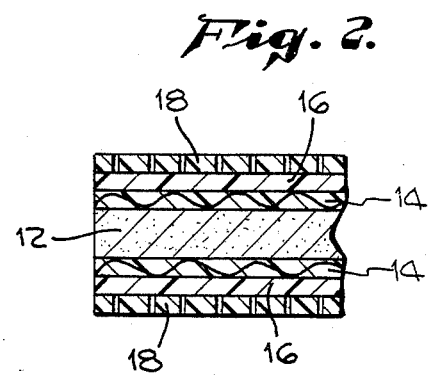
FIG. 2 is a cross-sectional view of FIG. 1 taken in the II—II plane.

In the preferred embodiment of the apparatus shown in FIGS. 1 and 2, the absorbent strip 12 consists of multiple layers of high grade paper pulp. Preferably, the paper pulp absorbent layer will have a thickness ranging from about 2.0 to 2.5 mm.

A layer of non-woven fabric 14 in a lattice network is directly positioned on each side of the absorbent strip 12. The lattice openings range in size from 2.5×2.5 mm to 3.0×3.0 mm. The purpose of this lattice network fabric is to connect or link the main absorbent body with the two plastic layers. The preferred fabric is a synthetic in the form of rayon ratline, polyester fiber, or nylon fiber.

After placing the fabric layers 14 on each side of the absorbent strip 12, the fabric layer 14 is integrated into the absorbent strip 12. The preferred method of integration is heat-sealing or thermocompression bonding since adhesive agents such as chemical glues may pose a possible health hazard.

The absorbent strip 12 and fabric 14 combination are then covered with a plastic film layer 16. The plastic film 16 preferably used is capable of being impregnated with a flavor essence. The added flavoring prevents the food substance from possibly acquiring the preservative's odors. Thus, the preservative can remain in close proximity with the food substance without ever tainting the food substance's flavor. Suitable plastics for use as layer 16 include vinylchloride, polystyrene, and polyolefin. Other suitable gas permeable plastics are possible.

Next, a plastic cover 18 is placed around the absorbent strip 12, non-woven fabric 14, and plastic film 16 combination. The plastic cover 18 may take the form of polyvinylidene chloride, polyvinyl alcohol (PVA), or polyacrylonitrile. It is then sealed by either heat-sealing, electric corona method, or ultrasonic wave method.

Figure 4:
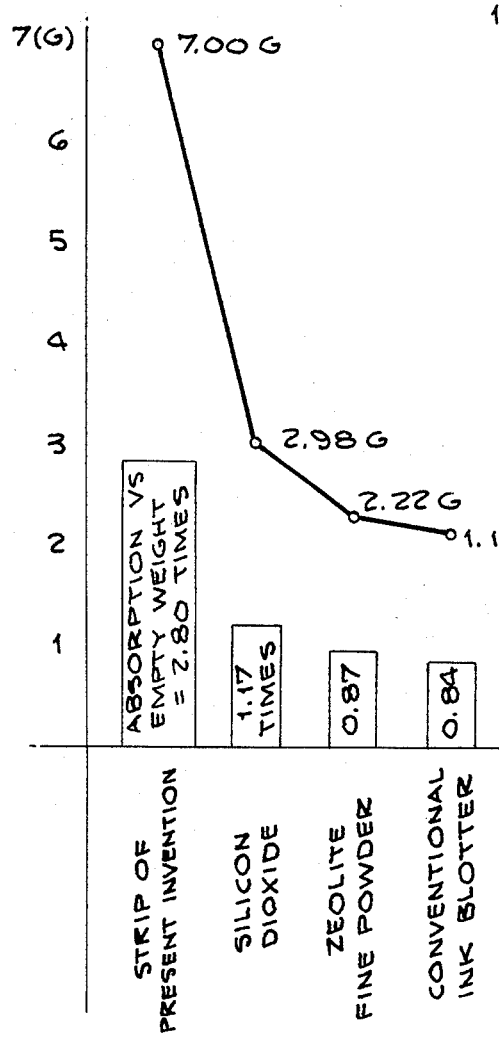
FIG. 4 is an absorption capacity graph illustrating the present invention's capacity compared with other absorbents.

FIG. 4 shows the absorption capacity of the present invention versus various other absorbents. After maximum absorption, the present invention will hold 2.8 times its empty weight. Silicon dioxide will hold only 1.17 times its empty weight, zeolite fine powder only 0.87, and a conventional ink blotter only 0.84. The high absorption capacity reveals the potential preservation power of the present invention. The capacity is almost two and a half times that of silicon dioxide.

A unique feature of the present invention is its capability to regulate the gas emission rate in order to disperse only that amount actually needed to preserve the food effectively. This quantitatively controlled emission is accomplished by small perforations in the plastic cover 18 as, shown in FIG. 6a, and by selectively opening the sides and ends of the strip absorbent as shown in FIGS. 6b-d.

Figure 5:
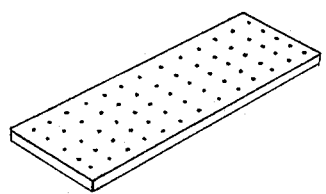
FIG. 5a–d are perspective views of the food preservative and dispersing apparatus with the emission rate regulated by opening the sides and faces.
Figure 5:
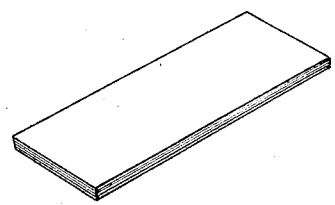
Figure 5:
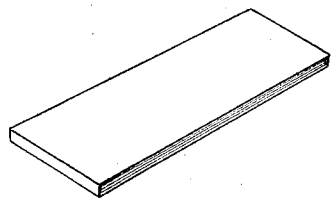
Figure 5:
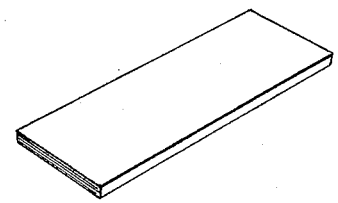
Figure 5:
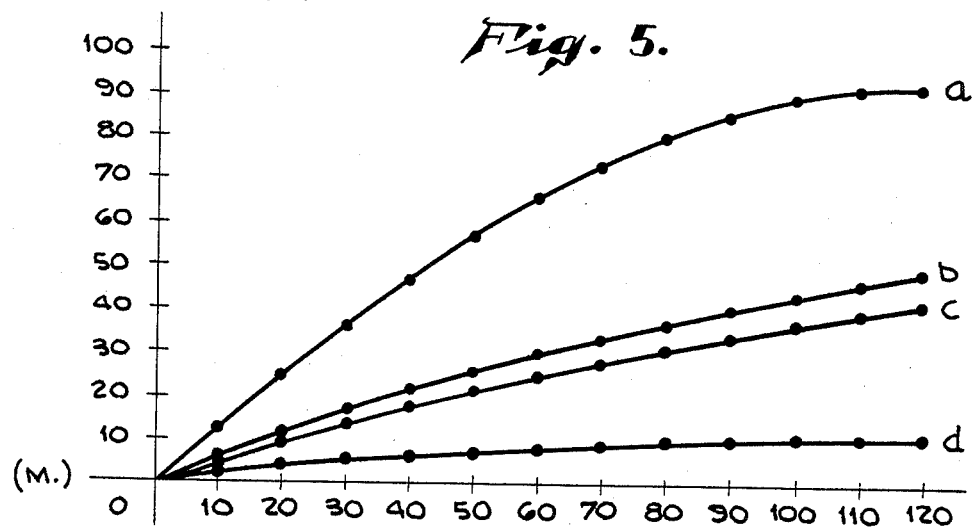

Now referring to FIG. 5, a graph illustrates the rate of evaporation for the various scenarios illustrated in FIGS. 6a-d. Line a of FIG. 5 corresponds to FIG. 6a and shows the evaporation rate when the top of the absorbent strip contains perforations and all sides and ends are opened. Note that over 90% of the liquid preservative evaporates in approximately two hours. This configuration provides the maximum preservation effect.

Line b of FIG. 5 corresponds to FIG. 6b. In this illustration the absorbent strip has a non-perforated plastic cover, but the all sides and ends are open. This reduces the evaporation rate by almost 50% of the previous configuration.

Lines c and d of FIG. 5 correspond to FIGS. 6c and 6d, respectively. Again, the absorbent strip is covered with a non-perforated plastic, but in these instances, the sides and ends are not opened simultaneously. In FIG. 6c, only the sides of the absorbent are open, and in FIG. 6d, only the ends of the absorbent strip are opened. Both of these configurations reduce the evaporation rate with FIG. 6d reducing it over FIG. 6a by almost 85%.

The purpose behind controlling the evaporation rate is to regulate the preservation effect for various food items. If a food item has high moisture levels such as fresh meat and fish, then the preservation effect will need to be much greater than the preservative for a low moisture food such as flour. The evaporation controls allow the preservative in the lower moisture foods to last longer with little or no loss of preservation effect while at the same time retain the capability of being used with a high moisture food product.

Having thus described exemplary embodiments of the present invention, it should be noted by those skilled in the art that the within disclosures are exemplary only and that various other alternatives, adaptations and modifications may be made within the scope of the present invention which is defined and limited only by the following claims.

I claim:

1. An apparatus for dispersing a gaseous food preservative into a vessel containing food substance comprising:
    an absorbent strip comprising at least one absorbent layer having a top and a bottom;
    a layer of non-woven fabric in a lattice network placed onto said top and bottom of said absorbent strip forming a non-woven fabric combination having a top and a bottom;
    a plastic film placed onto said top and bottom of said non-woven fabric combination forming a plastic film combination having a top and a bottom; and
    a plastic cover placed onto said top and bottom of said laminated film combination, said plastic cover being sealed along its edges.

2. An apparatus according to claim 1, wherein said absorbent strip is impregnated with a liquid for evaporation to form a gaseous preservative.

3. An apparatus according to claim 2, wherein said absorbent strip is comprised of multiple layers of high grade paper pulp.

4. An apparatus according to claim 3, wherein said paper pulp is about 2.0 to about 2.5 mm in thickness.

5. An apparatus according to claim 1, wherein said non-woven fabric is selected from the group consisting of rayon ratline, polyester fiber, or nylon fiber.

6. An apparatus according to claim 1, wherein said non-woven fabric combination is integrated by heat-sealing.

7. An apparatus according to claim 1, wherein said plastic film is capable of being impregnated with flavor essence.

8. An apparatus according to claim 1, wherein said plastic cover is a plastic selected from the group comprising polyvinylidene chloride, polyvinyl alcohol (PVA), and polyacrilonitrile.

9. An apparatus according to claim 8, wherein said plastic cover contains perforations.

10. An apparatus according to claim 8, wherein said plastic cover is sealed by heat-sealing, electric corona method, or ultrasonic wave method.

11. An apparatus according to claim 9, wherein said plastic cover is sealed by heat-sealing, electric corona method, or ultrasonic wave method.

12. An apparatus according to claim 8, wherein said plastic cover is not sealed along its edges.

13. An apparatus according to claim 9, wherein said plastic cover is not sealed along its edges.

14. An apparatus according to claim 1, wherein said plastic film is selected from the group consisting of vinylchloride, polystyrene, and polyolefin.

* * * * *